United States Patent
Shibukawa et al.

(10) Patent No.: US 9,779,871 B2
(45) Date of Patent: Oct. 3, 2017

(54) MANUFACTURING DEVICE FOR CLEFT MAGNET

(71) Applicant: NISSAN MOTOR CO., LTD., Yokohama-shi, Kanagawa (JP)

(72) Inventors: Hiroaki Shibukawa, Machida (JP); Kimio Nishimura, Yokohama (JP); Masahiro Omata, Yokohama (JP); Takashi Sekikawa, Yokohama (JP); Yasushi Matsushita, Yokohama (JP); Kiyoshi Hasegawa, Yokohama (JP); Akihisa Hori, Yokohama (JP); Takumi Ohshima, Yokohama (JP); Michito Kishi, Atsugi (JP); Hideki Watanabe, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/429,918

(22) PCT Filed: Sep. 19, 2013

(86) PCT No.: PCT/JP2013/075318
§ 371 (c)(1),
(2) Date: Mar. 20, 2015

(87) PCT Pub. No.: WO2014/046189
PCT Pub. Date: Mar. 27, 2014

(65) Prior Publication Data
US 2015/0270060 A1    Sep. 24, 2015

(30) Foreign Application Priority Data

Sep. 21, 2012 (JP) .................................. 2012-208366

(51) Int. Cl.
*H01F 41/02* (2006.01)
*B26F 3/00* (2006.01)
*H02K 15/03* (2006.01)

(52) U.S. Cl.
CPC ............ *H01F 41/0253* (2013.01); *B26F 3/00* (2013.01); *H02K 15/03* (2013.01); *Y10T 225/22* (2015.04)

(58) Field of Classification Search
CPC ........ H01F 41/0253; B26F 3/00; B26F 3/002; Y10T 83/2066; Y10T 83/2068;
(Continued)

(56) References Cited

U.S. PATENT DOCUMENTS 3,944,203 A * 3/1976 Brekelbaum .......... B23K 7/002
266/65
3,991,296 A * 11/1976 Kojima .............. B23K 26/1417
219/121.68
(Continued)

FOREIGN PATENT DOCUMENTS

CN         103650304 A    3/2014
EP         2 573 916 A1   3/2013
(Continued)

*Primary Examiner* — Stephen Choi
(74) *Attorney, Agent, or Firm* — Foley & Lardner LLP

(57) ABSTRACT

A manufacturing device for cleft magnets comprises a cleaving mechanism for cleaving a magnet plate by applying a pressing force to the magnet plate corresponding to a back of a groove formed on one surface of the magnet plate and a carry-in mechanism for carrying the magnet plate to a cleaving position by the cleaving mechanism. By comprising a foreign matter removal mechanism for removing a foreign matter adhering to the magnet plate before the magnet plate is carried to the cleaving position by the carry-in mechanism, the foreign matter adhering to the magnet plate is removed before cleaving.

4 Claims, 5 Drawing Sheets

(58) Field of Classification Search
CPC ... Y10T 83/207; Y10T 83/242; Y10T 83/263; Y10T 225/12; Y10T 225/321; Y10T 225/325
See application file for complete search history.

(56) References Cited

U.S. PATENT DOCUMENTS

| | | | |
|---|---|---|---|
| 6,497,403 B2* | 12/2002 | Ries | H01L 21/6875 269/20 |
| 2004/0074366 A1* | 4/2004 | Choo | C03B 33/03 83/886 |
| 2009/0127762 A1* | 5/2009 | Kilian | B23K 26/38 269/296 |
| 2010/0024618 A1* | 2/2010 | Minemura | B23Q 11/0046 83/168 |
| 2010/0162758 A1* | 7/2010 | Lang | B65G 49/064 65/29.11 |
| 2010/0244608 A1 | 9/2010 | Nakamura et al. | |
| 2012/0125969 A1* | 5/2012 | Nishikuma | H02K 15/03 225/93 |
| 2014/0144337 A1* | 5/2014 | Koike | B28D 1/222 100/35 |

FOREIGN PATENT DOCUMENTS

| | | |
|---|---|---|
| EP | 2 738 922 A1 | 6/2014 |
| JP | 2002-35984 A | 2/2002 |
| JP | 2009-142081 A | 6/2009 |
| WO | WO 2011/145433 A1 | 11/2011 |
| WO | WO 2013/015047 A1 | 1/2013 |

* cited by examiner

MANUFACTURING DEVICE FOR CLEFT MAGNET

FIELD OF THE INVENTION

This invention relates to a technology for manufacturing cleft magnets used in electric motors and generators.

BACKGROUND OF THE INVENTION

An interior permanent magnet (IPM) motor in which permanent magnets are embedded in rotor slots formed in a rotor is known as an electric motor for an electric vehicle.

JP2009-142081A, published by the Japan Patent Office in 2009, makes a proposal with respect to the permanent magnets inserted into the rotor slot of such an IPM motor. Specifically, a plurality of magnet pieces are produced by cleaving a magnet plate formed by pressure-molding magnetic particles. The magnet pieces are inserted into the rotor slots in an abutting state to restore a permanent magnet. The obtained permanent magnet has a favorable property in suppressing an eddy current.

SUMMARY OF THE INVENTION

The permanent magnet is cleft by forming a groove in advance on one surface of the magnet plate and applying a pressing force onto another side of the magnet plate at a location corresponding to the groove. The magnet plate is thereby cleft at the center of the groove.

In cleaving, one side of the magnet plate is lifted if a foreign matter such as a piece of fractured magnet or a contamination substance is caught between the magnet plate and a die supporting the surface in which the groove is formed. If a pressing force is applied onto the other surface of the magnet plate at the location corresponding to the groove in this state, the foreign matter creates a bending moment in the magnet plate. If a tensile force caused by the bending moment acts on the magnet plate in addition to tensile force acting on the magnet plate in the absence of the foreign matter, a cleaving line may be displaced from the groove and the magnet plate may be abnormally broken. To enhance manufacturing quality of the permanent magnets, it is essential to prevent such abnormal breakage.

It is therefore an object of this invention to suppress abnormal breakage of a magnet plate caused by a foreign matter caught between a magnet plate and a die, in a device for manufacturing cleft magnets by cleaving a magnet plate.

In order to achieve the above object, a manufacturing device for cleft magnets according to an aspect of this invention comprises a cleaving mechanism for cleaving a magnet plate having a groove on one surface by applying a pressing force onto another surface of the magnet plate corresponding to a back of the groove and a carry-in mechanism for carrying the magnet plate to a cleaving position by the cleaving mechanism. The manufacturing device further comprises a foreign matter removal mechanism for removing a foreign matter adhering to the magnet plate before the magnet plate is carried to the cleaving position by the carry-in mechanism.

DESCRIPTION OF THE PREFERRED EMBODIMENTS

The embodiments of this invention will be described with reference to the accompanying drawings.

Figure 1:
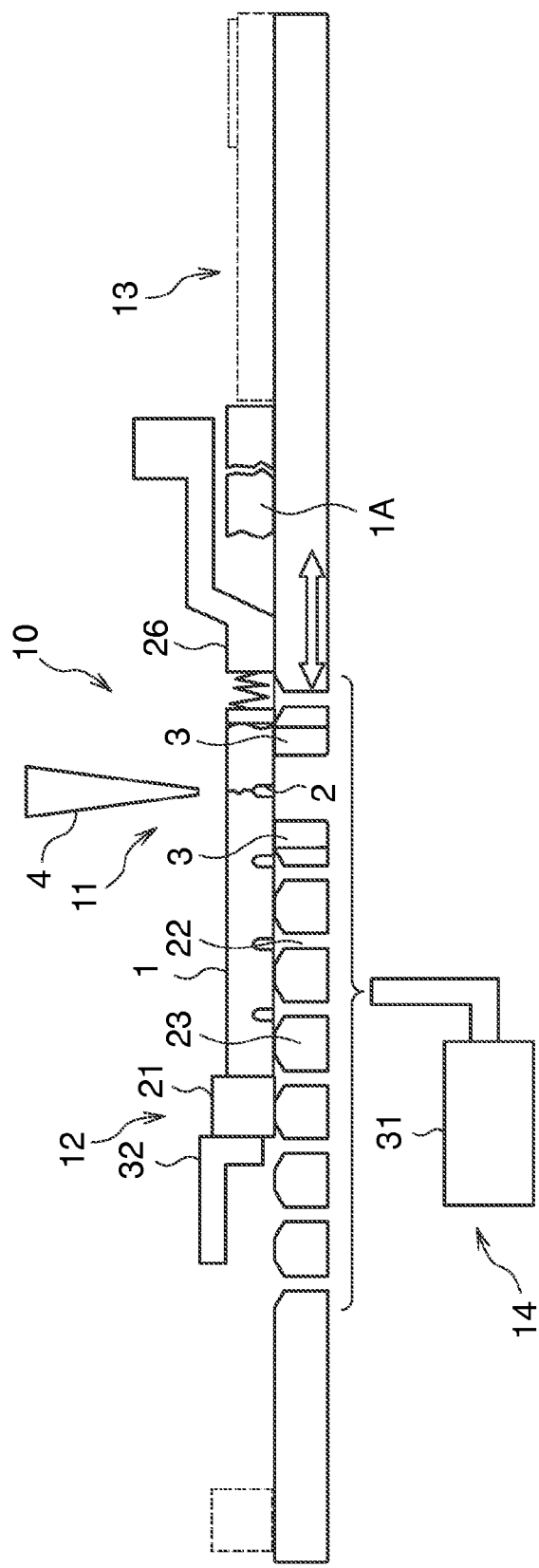
FIG. 1 is a schematic longitudinal sectional view of a manufacturing device for cleft magnets according to a first embodiment of this invention.

Referring to FIG. 1 of the drawings, a manufacturing device 10 for cleft magnets according to a first embodiment of this invention comprises a cleaving mechanism 11 for cleaving a magnet plate 1, a carry-in mechanism 12 for carrying the magnet plate 1 into the cleaving mechanism 11, a foreign matter removal mechanism 14 for removing a foreign matter adhering to the magnet plate 1 prior to cleaving, and a carry-out mechanism 13 for carrying out cleft pieces of the magnet plate 1. The magnet plate 1 is formed by solidifying magnetic particles into a plate-like body by pressure molding and sintering. Grooves 2 are formed at regular intervals on one surface of the magnet plate 1.

Figure 2:
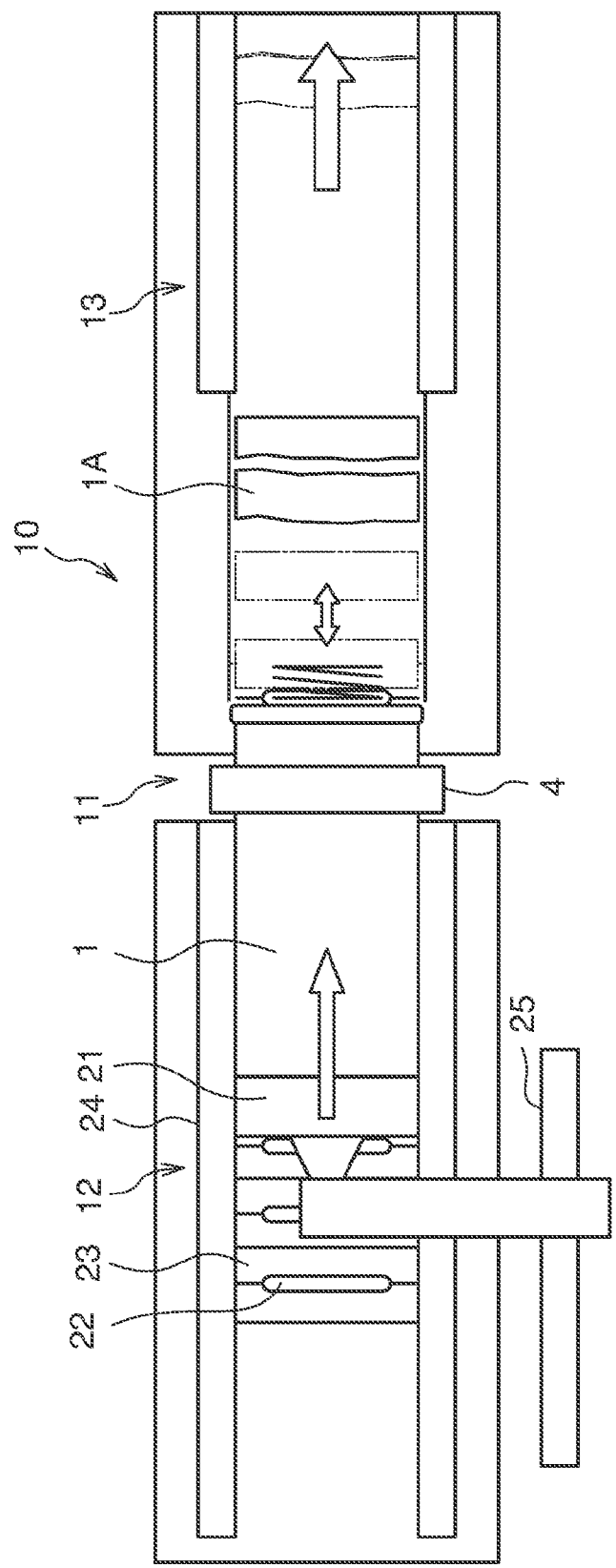
FIG. 2 is a schematic plan view of the manufacturing device for cleft magnets according to the first embodiment of this invention.

Referring to FIG. 2, the cleaving mechanism 11 comprises a pair of dies 3 for supporting the magnet plate 1 from below, a blade 4 for pressing the back of the groove 2 of the magnet plate 1 from above and a stopper 26 for positioning the magnet plate 1 carried by the carry-in mechanism 12 at a predetermined cleaving position. The predetermined cleaving position is a position where the groove 2 is located in the center between the pair of dies 3. The magnet plate 1 is successively cleft by the cleaving mechanism 11 for each of blocks partitioned by the grooves 2.

The carry-in mechanism 12 comprises a plurality of supports 23 for supporting the magnet plate 1 from below, a slider 21 to be displaced along a rail 25 and a guide 24 for guiding the magnet plate 1 on the support 23 pressed by the slider 21 toward the cleaving mechanism 11.

The plurality of supports 23 are arranged in a row with gaps 22 extending in a direction perpendicular to a sliding direction of the magnet plate 1. A surface of each support 23 to be held in contact with the magnet plate 1 is formed to have a substantially triangular cross-section as shown in FIG. 1. This causes each support 23 to come into line contact with the magnet plate 1 and reduces frictional resistance against a sliding movement of the magnet plate 1.

Referring again to FIG. 2, the slider 21 displaces along the rail 25 and presses the rear end of the magnet plate 1 on the supports 23, thereby sliding the magnet plate 1 toward the cleaving mechanism 11 by a distance corresponding to the interval of the grooves 2 inside the guide 24. It should be noted that the magnet plate 1 is placed on the supports 23 in advance with the grooves 2 faced down.

As described above, the magnet plate 1 is successively cleft by the cleaving mechanism 11 for each of the blocks partitioned by the grooves 2. The slider 21 slides the magnet plate 1 toward the cleaving mechanism 11 every time the cleaving mechanism 11 performs cleaving. It should be noted that a cleft piece 1A is carried out by the carry-out mechanism 13.

The foreign matter removal mechanism 14 functions to remove foreign matters such as pieces of broken magnet and contamination substances adhering to the magnet plate 1 carried into the cleaving mechanism 11 by the carry-in mechanism 12.

In forming the grooves 2 on the magnet plate 1, burrs may be formed on both sides of the grooves 2. These burrs are removed in advance, but pieces of broken burr removed at that time may adhere to the magnet plate 1. Further, when the cleaving mechanism 11 cleaves the magnet plate 1, pieces of broken magnet may be produced and these may also adhere to the magnet plate 1. Foreign matters adhering to the magnet plate 1 in this way may be caught between the dies 3 and the magnet plate 1 when the slider 21 slides the magnet plate 1 toward the cleaving mechanism 11 to cleave the next block.

If a foreign matter is caught between the die 3 and the magnet plate 1, a bending moment is applied to the magnet plate 1 when the blade 4 cleaves the magnet plate 1, resulting in causing abnormal breakage in the magnet plate 1.

In this embodiment, the foreign matter removal mechanism 14 removes foreign matters adhering to the magnet plate 1 prior to the cleaving of the magnet plate 1 to prevent abnormal breakage.

Referring again to FIG. 1, the foreign matter removal mechanism 14 is configured by a dust collector 31 and a blower 32.

The dust collector 31 collects foreign matters adhering to the lower surface of the magnet plate 1 located on the supports 23 and those adhering to the grooves 2 by sucking them via the gaps 22. Since a plurality of gaps 22 are present at regular intervals, the dust collector 31 can apply a suction force over a wide range of the lower surface of the magnet plate 1. It should be noted that when the magnet plate 1 is positioned at a position, where the magnet plate 1 is cleft by the blade 4, by the stopper 26, the grooves 2 other than the groove 2 located at the cleaving position by the blade 4 are set at positions corresponding to the gaps 22, i.e. positions right above the gaps 22. Further, since upper parts of the supports 23 are formed to have a substantially triangular cross-section as described above and held in line contact with the magnet plate 1, the dust collector 31 can remove the foreign matters on the entire lower surface of the magnet plate 1 including the grooves 2 without being obstructed by the supports 23. Furthermore, foreign matters adhering to the supports 23 are also removed by the dust collector 31.

On the other hand, the blower 32 is sandwiched between the rear end of the magnet plate 1 and the slider 21 and slides integrally with the magnet plate 1 toward the cleaving mechanism 11. The blower 32 blows air toward the supports 23 from the rear end of the magnet plate 1, thereby causing foreign matters remaining on the supports 23 to fall to a side below the carrying device 12 via the gaps 22.

Since the magnet plate 1 is carried onto the dies 3 after the foreign matters are removed in this way, no foreign matter is caught between the magnet plate 1 and the dies 3 and abnormal breakage caused in the magnet plate 1 by the presence of a foreign matter can be prevented in a cleaving process of the magnet plate 1 by the blade 4. Accordingly, the manufacturing device 10 for cleft magnets cleaves the magnet plate 1 at the grooves 2 with high cleaving accuracy. Thus, the cleft pieces 1A with good quality and small dimensional variation can be obtained as a result of cleaving.

In this embodiment, the blower 32 is not an essential element of the foreign matter removal mechanism 14. It is also possible to configure the foreign matter removal mechanism 14 only by the dust collector 31.

Figure 3:
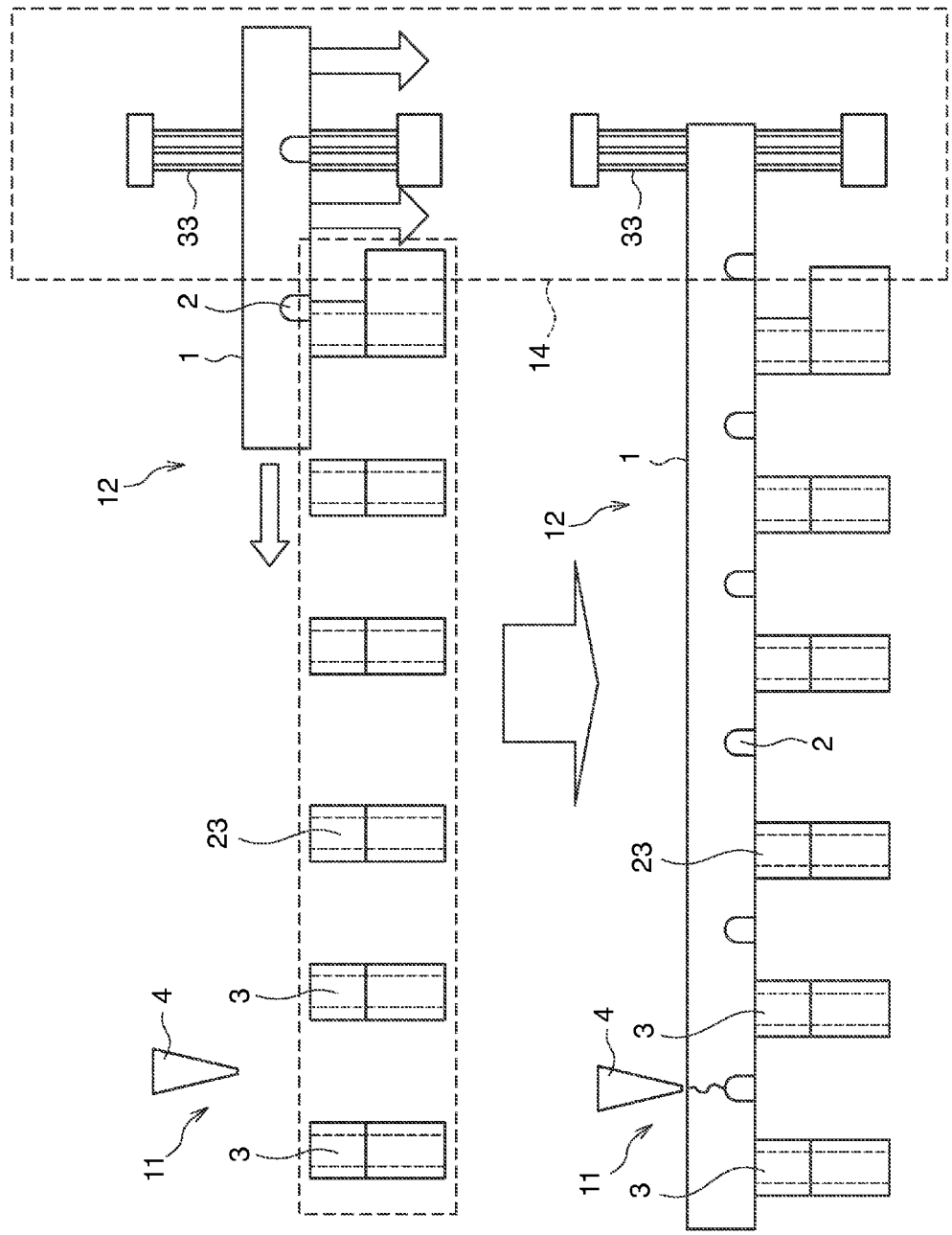
FIGS. 3A and 3B are a schematic longitudinal sectional view and a schematic plan view of essential parts of a manufacturing device for cleft magnets according to a second embodiment of this invention.

Referring to FIGS. 3A and 3B, a second embodiment of this invention concerning the foreign matter removal mechanism 14 will be described. It should be noted that a sliding direction of the magnet plate 1 by the carry-in mechanism 12 in FIGS. 3A and 3B is opposite to that shown in FIGS. 1 and 2.

The foreign matter removal mechanism 14 according to this embodiment comprises a brush 33 instead of the dust collector 31 and the blower 32 of the first embodiment. The brush 33 scrapes off foreign matters such as pieces of broken magnet and contamination substances adhering to the magnet plate 1 by bringing bristle ends into contact with the magnet plate 1 sliding toward the cleaving mechanism 11.

It should be noted that the brush 33 could also be an air brush.

By removing the foreign matters from the magnet plate 1 by the brush 33 in this way, abnormal breakage of the magnet plate 1 resulting from a foreign matter caught in the cleaving process can be prevented as in the first embodiment. According to this embodiment, the foreign matter removal mechanism 14 can be inexpensively realized by a simple configuration. Since the dust collector 31 is not used in this embodiment, the supports 23 may not be formed to have a triangular cross-section unlike in the first embodiment.

Figure 4:
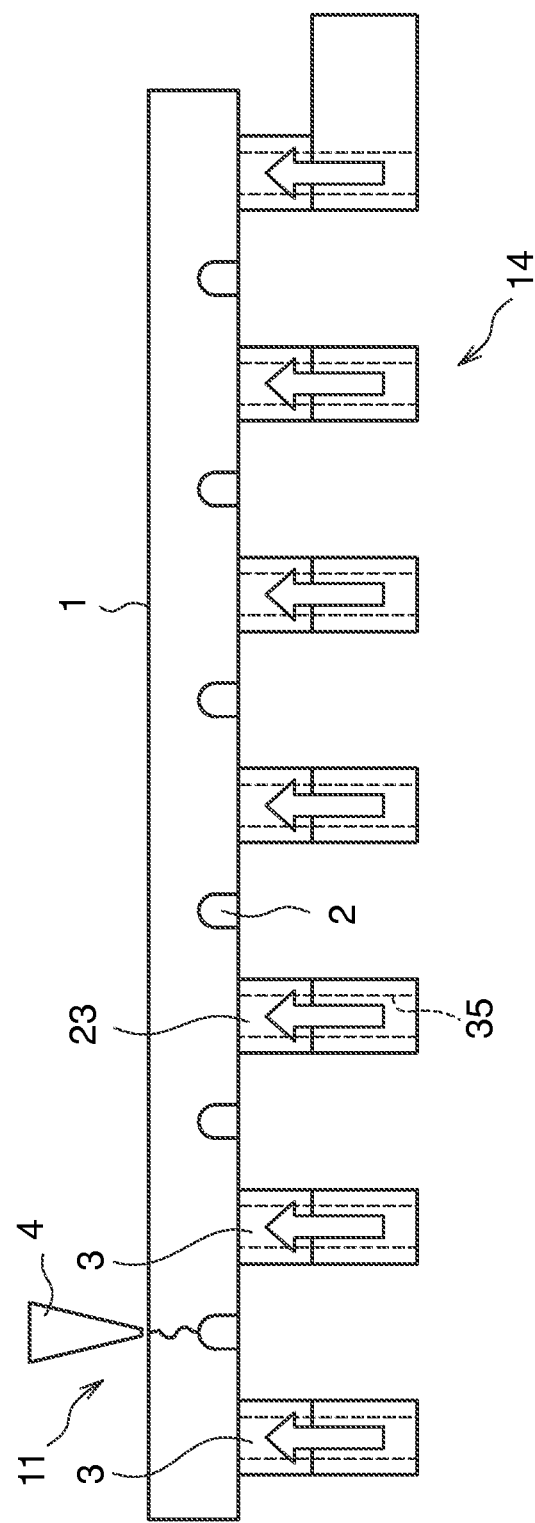
FIG. 4 is a schematic longitudinal sectional view of essential parts of a manufacturing device for cleft magnets according to a third embodiment of this invention.
Figure 5:
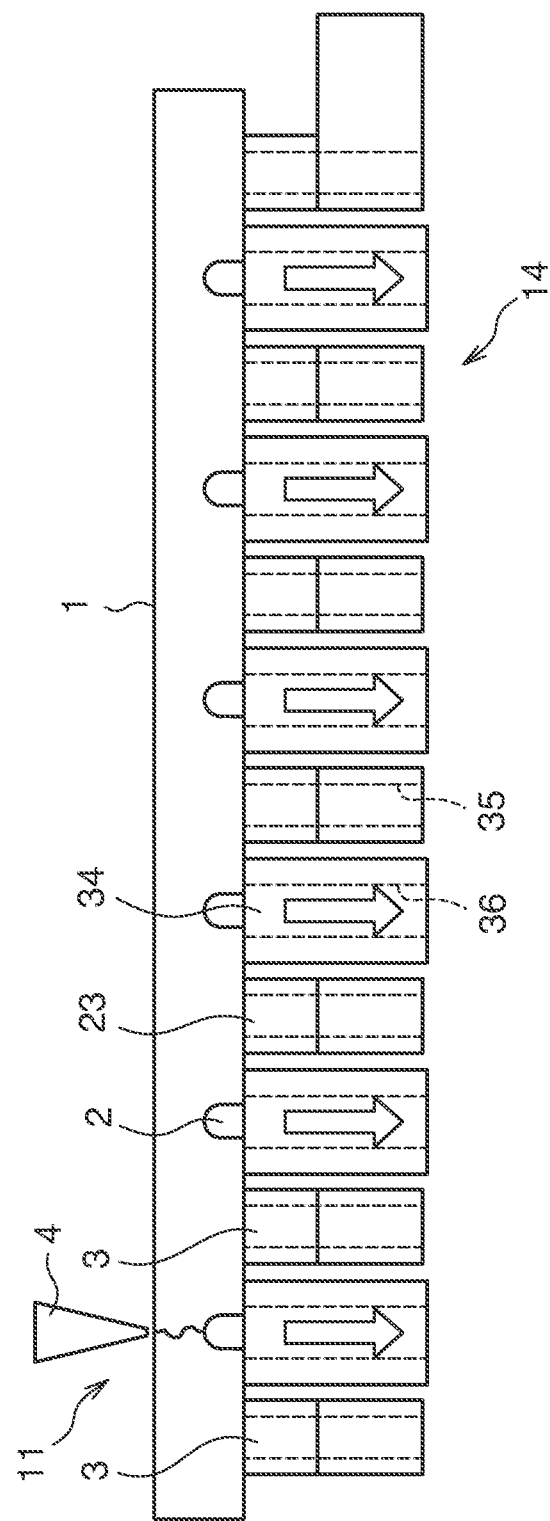
FIG. 5 is similar to FIG. 4, but showing a situation where air suction pipes are further applied.

Referring to FIGS. 4 and 5, a third embodiment of this invention concerning the foreign matter removal mechanism 14 will described.

The foreign matter removal mechanism 14 according to this embodiment comprises a plurality of air supply holes 35 and a plurality of air suction ports 36 instead of the dust collector 31 and the blower 32 of the first embodiment.

Referring to FIG. 4, the air supply holes 35 are formed to vertically penetrate each support 23 and each die 3. The air supply holes 35 are connected to a compressor not shown. Blowout ports for blowing air around from the air supply holes 35 are formed at the upper ends of each support 23 and each die 3. Foreign matters such as pieces of broken magnet and contamination substances adhering to the lower surface of the magnet plate 1 are blown off by the air blown out from the blowout ports.

Referring to FIG. 5, the air suction ports 36 are formed in air suction pipes 34. The air suction pipes 34 face the grooves 2 of the magnet plate 1 supported on the supports 23 from below. The air suction ports 36 are connected to a suction device not shown. The air suction pipes 34 suck the air blown out from the air supply holes 35 located on both sides together with foreign matters removed from the magnet plate 1 by the air blown out from the air supply holes 35. By the above configuration, the foreign matter removal mechanism 14 removes the foreign matters from the magnet plate 1 before the cleaving mechanism 11 cleaves the magnet plate 1.

Accordingly, abnormal breakage of the magnet plate 1 resulting from a foreign matter caught in the cleaving process can be prevented as in the first embodiment.

It should be noted that the air suction pipes 34 are not an essential element of the foreign matter removal mechanism 14 in this embodiment. The air suction pipes 34 have a preferable effect in preventing the scattering of foreign matters, but an action of removing foreign matters from the magnet plate 1 can also be achieved only by the air supply holes 35. Since the air supply holes 35 are formed in constituent members of the carry-in mechanism 12 and the cleaving mechanism 13 such as the supports 23 and the dies 3, dedicated members for forming the air supply holes 35 are not necessary.

It is also preferable that the air suction pipes 34 are configured to be movable between a suction position shown in FIG. 5 and a retracted position so as to move to the suction position only when a foreign matter removal process is performed and retract to the retracted position when other processes are performed. The air suction ports 36 may be provided in the supports 23 and the dies 3 and the air supply holes 35 may be provided between the supports 23.

As described above, the manufacturing device 10 for cleft magnets according to this invention comprises the foreign matter removal mechanism 14 for removing foreign matters from the magnet plate 1 before the magnet plate 1 is cleft by the cleaving mechanism 11. The foreign matter removal mechanism 14 prevents a foreign matter from being caught between the magnet plate 1 and the die 3 when the magnet plate 1 is cleft by the cleaving mechanism 11. Thus, abnormal breakage of the magnet plate 1 caused by the foreign matter caught between the magnet plate 1 and the die 3 can be prevented. As a result, the magnet plate 1 is reliably cleft at the grooves 2 and accuracy in cleaving the magnet plate 1 can be enhanced. This brings about a preferable effect in improving the quality of a permanent magnet.

The foreign matter removal mechanism 14 may be constituted by the dust collector 31 for sucking air via the gaps 22 between the plurality of supports 23 as shown in the first embodiment. In this case, a foreign matter removal range can be widened by forming contact parts of the supports 23 with the magnet plate 1 to have a substantially triangular cross-section. Further, foreign matters on the supports 23 can also be removed by providing the carry-in mechanism 12 with the blower 32 facing the groove 2 from above.

If the foreign matter removal mechanism 14 is constituted by the brush 33 as shown in the second embodiment, it can be inexpensively realized by a simple configuration.

The foreign matter removal mechanism 14 may be configured by the air supply holes 35 vertically penetrating the supports 23 and the dies 3 as shown in the third embodiment. In this case, it is not necessary to provide dedicated members for forming the air supply holes 35 and the foreign matter removal mechanism 14 can be installed in a space-efficient manner. It should be noted that the air supply holes 35 could also be formed only in the supports 23 or only in the dies 3. Further, foreign matters can be reliably collected by providing the air suction ports 36 in addition to the air supply holes 35 as the foreign matter removal mechanism 14.

As described above, the foreign matter removal mechanism 14 removes foreign matters such as pieces of broken magnet and contamination substances adhering to the magnet plate 1 before the magnet plate 1 is carried to the cleaving position by the carry-in mechanism 12. This prevents foreign matters from being caught between the magnet plate 1 and the cleaving mechanism 11 when the magnet plate 1 is cleft by the cleaving mechanism 11. As a result, abnormal breakage of the magnet plate 1 is less likely to occur and accuracy in cleaving the magnet plate 1 can be enhanced.

Although the embodiments of this invention have been described above, the above embodiments are merely some application examples of this invention and not of the nature to limit the technical scope of this invention to the specific configurations of the above embodiments.

The contents of Tokugan 2012-208366, with a filing date of Sep. 21, 2012 in Japan, are hereby incorporated by reference.

The invention claimed is:

1. A manufacturing device for cleft magnets, comprising:
a cleaving mechanism for cleaving a magnet plate having a groove on one surface by applying a pressing force onto another surface of the magnet plate corresponding to a back of the groove;
a carry-in mechanism for moving the magnet plate to a cleaving position by the cleaving mechanism; and
a foreign matter removal mechanism for removing a foreign matter from the magnet plate in a course of the carry-in mechanism moving the magnet plate to the cleaving position;
wherein the carry-in mechanism comprises a plurality of supports for supporting the magnet plate being moved to the cleaving position in an upward facing posture, and
wherein the foreign matter removal mechanism comprises a dust collector for applying a suction force to a gap between the plurality of supports.

2. The manufacturing device for cleft magnets according to claim 1, wherein contact parts of the plurality of supports with the magnet plate are formed to have a substantially triangular cross-section.

3. The manufacturing device for cleft magnets according to claim 1, wherein the foreign matter removal mechanism comprises a blower for blowing air into the gap between the supports after a passage of the magnet plate.

4. The manufacturing device for cleft magnets according to claim 1, wherein the supports are arranged such that a plurality of gaps are formed therebetween, and the dust collector is configured to apply the suction force to the plurality of gaps simultaneously.

* * * * *